June 22, 1937.    J. GARTNER    2,084,800
INDICATING AND CONTROL APPARATUS
Filed March 30, 1935
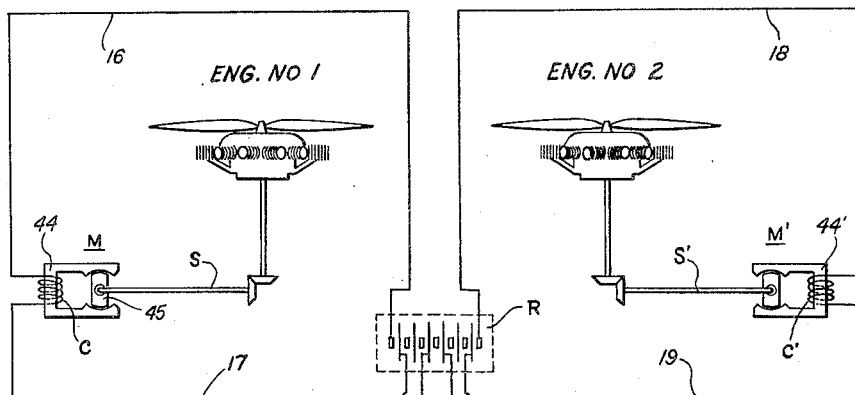
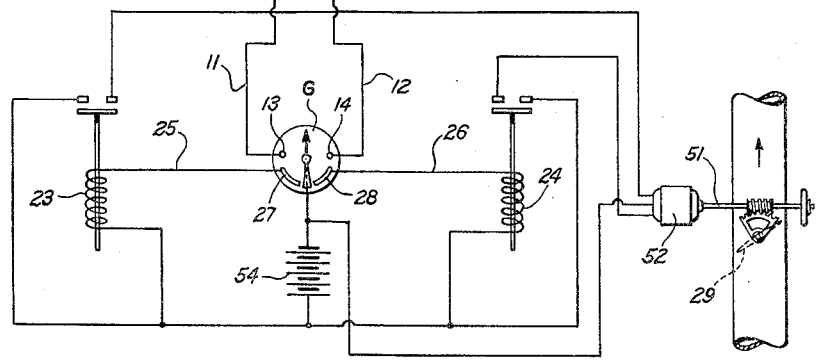
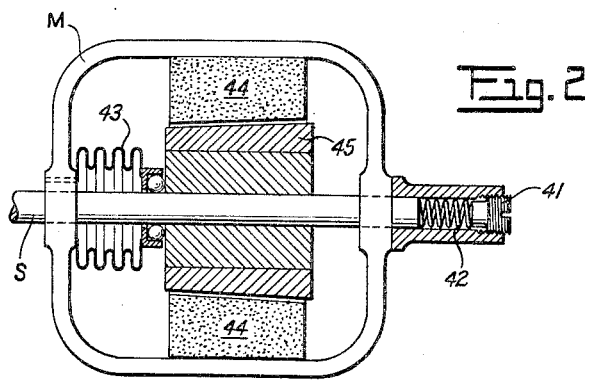
INVENTOR.
John Gartner
BY Martin J. Finnegan
ATTORNEY.

Patented June 22, 1937

2,084,800

UNITED STATES PATENT OFFICE 2,084,800

INDICATING AND CONTROL APPARATUS

John Gartner, New York, N. Y., assignor to Eclipse Aviation Corporation, East Orange, N. J., a corporation of New Jersey Application March 30, 1935, Serial No. 13,987

8 Claims. (Cl. 60—97)

This invention relates to indicating apparatus and particularly to means for indicating the relationship between the rates of movement of any two or more continuously moving mechanisms such as internal combustion engines installed on an airplane or other craft and subject to variations in speed.

An object of the invention is to provide an indicating system including a synchroscope and means for causing said synchroscope to assume a definite position or condition when the subjects of study, such as the internal combustion engines above suggested, are operating in synchronism, and to display a different type of indication when said engines are rotating at different speeds.

This and other objects and advantages will appear more fully from a consideration of the detailed description which follows, with reference to the accompanying drawing, wherein is illustrated one embodiment of the invention. It is to be expressly understood, however, that the drawing is for the purpose of illustration only, and is not designed as a definition of the limits of the invention, reference being had for this purpose to the appended claims.

In the drawing:

Fig. 1 is a combined mechanical and schematic representation of the invention as applied to two independently rotating bodies S and S'; and Fig. 2 is a longitudinal sectional view of one of the magnetos shown diagrammatically in Fig. 1.

Reference characters S and S' indicate rotating shafts such as the crankshafts of two distinct internal combustion engines (or shafts geared thereto) adapted to drive magnetos M and M' respectively. These magnetos are of equal capacity, and also of simple construction embodying preferably but a single set of poles cooperating with a rotary inductor in such a way that each revolution involves two reversals in the direction of current flow through the stationary coils C and C', the latter being connected to terminals of a rectifier R which may be of any suitable construction for the purpose but is preferably of the copper oxide type exemplified in Patent No. 1,980,176. The rectifier is provided with a set of output or direct current leads 11 and 12 connected to the conventional plus and minus terminals 13 and 14 of a direct current voltmeter or galvanometer G having the usual scale and pointer, occupying the vertical or zero position when there is an absence of potential difference across the leads 11 and 12, and adapted to be deflected to the left or right when such a potential difference exists, the direction of deflection being of course determined by the direction of the potential gradient, (direction of current flow).

From the foregoing description it will be apparent that the pointer will give a zero indication whenever the speed of rotation of the magnetos M and M' is the same, for under such conditions the amount of current flow in the leads 16 and 17 will be the same as in the leads 18 and 19, since the magnetos will be developing equal values of E. M. F., it being assumed that they have initially been properly calibrated and adjusted to be equal; therefore, the rectifier output leads 11 and 12 will remain at equal values of potential and no current will flow therethrough. Now if the rotor of magneto M, for example, should accelerate beyond the speed of the rotor of magneto M', the currents flowing through the leads 16 and 18, instead of being equal and opposite as heretofore, will be unequal, and hence will create a potential difference across the leads 11 and 12 causing a deflection of the pointer to the left or right (according to the method of connection to the terminals) of the zero indication, the deflection being maximum when the difference in speeds of the two magneto rotors is maximum and becoming less as the two rotors approach the synchronous condition again.

It follows that the observer may have a continuous visual indication of the relation between the speeds of the two engines S and S' and by reason of the information thus obtained may proceed more intelligently to correct any speed differential by manually actuating one or the other of the throttle operating connections of the engines (one of which is shown at 51, Fig. 1)—or if desired, these members may be actuated by solenoids such as those shown at 23 and 24 to control operation of throttle actuating motor 52 of engine No. 2. These solenoids are energizable through connections 25 and 26 leading to switch elements 27 and 28 located in the path of the pointer, or a part mechanically connected thereto, the elements of the switches being so arranged that deflection of the pointer to the right connects the solenoid 23 with the battery 54, while deflection to the left energizes the solenoid 24, it being understood that the degree and direction of rotation of motor 52 determines the degree and direction of movement of the throttle 29, and thus causes acceleration or deceleration of engine No. 2, as required.

In place of the specially built and calibrated magnetos M and M' it is, of course, possible to employ the commercial magnetos normally carried on airplanes for engine ignition purposes, and mechanically driven from the engine to which the ignition is furnished; but in view of the extremely great difficulties encountered in attempting to equalize any two of these commercial magnetos, I have found that better results can be more readily assured by using special magnetos of simple construction and known magnetic qualities, and so designed that the air gap between inductor and stationary poles can be adjusted at will to produce identical characteristics in the two magnetos. Such an adjustment is shown at 41, Fig. 2, and includes a spring 42 (which may or may not be opposed by a heat responsive bellows 43) controlling the air gap between the pole shoes 44 and the rotating inductor 45, suitably tapered for the purpose, as shown. It is to be understood that movement of shafts (either angularly or axially) results in corresponding movement of the rotor 45; and likewise with respect to the rotor 45' of magneto M'.

What is claimed is:

1. The method of determining the speed ratio between two independently rotating elements which comprises the steps of generating alternating currents of magnitudes and frequencies which depend upon the rates of movement of respective elements being studied, isothermally rectifying the currents thus generated, and producing an indication of the potential characteristic of the resulting rectified current.

2. The combination with a pair of current conducting windings, of separate magneto-motive means for producing alternating current flow in said windings, a rectifier electrically connected with said magneto-motive means, a circuit constituting an outlet for uni-directional current derived from the isothermal rectification of the currents flowing from said windings to said rectifier, and an indicator in said circuit.

3. The combination with a pair of current conducting windings, of separate magneto-motive means for producing alternating current flow in said windings, a rectifier electrically connected with said magneto-motive means, a circuit constituting an outlet for uni-directional current derived from the isothermal rectification of the currents flowing from said windings to said rectifier, and an indicator in said circuit to signify whether or not said magneto-motive means are in synchronous rotation.

4. The combination with a plurality of internal combustion engines at least one of which includes a fuel intake line having a throttle therein, of a pair of current conducting windings, and separate magneto-motive means for producing alternating current flow in said windings, a rectifier having an outlet for uni-directional current derived from the rectification of the currents flowing in said windings, and means in circuit with said rectifier for controlling the degree of throttle opening in the intake line of at least one of said engines.

5. The method of synchronizing the propellers of a multi-engine aircraft having at least two engines, each propeller being driven by a respective engine, which method consists in suitably controlling the speed of one engine, producing an alternating current by the operation of said one engine, producing a second alternating current by the operation of the other engine, combining and rectifying the currents thus produced, converting the resulting rectified current into a mechanical torque whereby mechanical movement is produced in proportion to the difference in speed of the two engines, and utilizing said movement to cause regulation of the speed of said other engine to that of the first engine whereby said engines and their respective propellers are maintained in synchronism.

6. The method of synchronizing the propellers of a multi-engine aircraft having at least two engines, each propeller being driven by a respective engine, which method consists in producing an alternating current by the operation of one engine, producing a second alternating current by the operation of the other engine, combining said two alternating currents and producing a torque in proportion to the difference in E. M. F. values of the said separately generated currents, which torque drops to zero as soon as said E. M. F. values are equalized, and even through one of the said two currents remains out of phase with the other.

7. The method of synchronizing the propellers of a multi-engine aircraft having at least two engines, each equipped with a magneto and each constituting the motivating agency for one of the propellers, which method includes the steps of combining the alternating currents emanating from said magnetos, and producing a torque in proportion to the difference in E. M. F. values of the said separately generated magneto currents.

8. The combination with the propellers of a multi-engine aircraft having at least two engines, each equipped with an electrical machine having a rotor and stator, and each constituting the motivating agency for one of said propellers, of means for synchronizing said propellers, said means including a rectifier and a torque exerting device actuated by current derived from said rectifier, and means for moving said device in proportion to the amount of movement of one of said rotors in excess of the amount of movement of the other of said rotors.

JOHN GARTNER.